United States Patent
Jung et al.

(10) Patent No.: US 10,070,337 B2
(45) Date of Patent: Sep. 4, 2018

(54) METHOD FOR REPORTING INFORMATION RELATED TO D2D PERFORMED BY TERMINAL IN WIRELESS COMMUNICATION SYSTEM

(71) Applicant: LG Electronics Inc., Seoul (KR)

(72) Inventors: Sunghoon Jung, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/524,863

(22) PCT Filed: Nov. 16, 2015

(86) PCT No.: PCT/KR2015/012281
§ 371 (c)(1),
(2) Date: May 5, 2017

(87) PCT Pub. No.: WO2016/076676
PCT Pub. Date: May 19, 2016

(65) Prior Publication Data
US 2017/0366995 A1 Dec. 21, 2017

Related U.S. Application Data

(60) Provisional application No. 62/080,328, filed on Nov. 16, 2014, provisional application No. 62/145,479, filed on Apr. 9, 2015.

(51) Int. Cl.
*H04W 24/10* (2009.01)
*H04W 28/16* (2009.01)
*H04W 72/04* (2009.01)

(52) U.S. Cl.
CPC .......... *H04W 24/10* (2013.01); *H04W 28/16* (2013.01); *H04W 72/0426* (2013.01)

(58) Field of Classification Search
CPC .. H04W 24/10; H04W 72/0426; H04W 28/16
See application file for complete search history.

(56) References Cited

U.S. PATENT DOCUMENTS

2015/0245193 A1* 8/2015 Xiong .................. H04W 76/14
370/328
2016/0219541 A1* 7/2016 Chatterjee ............. H04W 76/18

OTHER PUBLICATIONS

Samsung, "Cell Reselection Issue," R2-144301, 3GPP TSG-RAN WG2 #87bis, Shanghai, China, Sep. 27, 2014, see section 2.
Qualcomm Incorporated, "Signaling Details for ProSe Direct Discovery," R2-144548, 3GPP TSG-RAN WG2 #87Bis, Shanghai, P.R. China, Sep. 26, 2014, see section 2.2.
3GPP TS 36.304 V8.5.0, TSG-RAN; E-UTRA; UE procedures in idle mode, Release 8, Mar. 2009.

* cited by examiner

*Primary Examiner* — Chuong A Ngo
(74) *Attorney, Agent, or Firm* — Dentons US LLP

(57) ABSTRACT

Provided is a method for reporting information related to device-to-device (D2D) performed by a terminal in wireless communication system and a terminal using the method. The method comprises: receiving configuration information requesting an information report related to D2D of a neighbor cell; acquiring information related to D2D for the neighbor cell indicated by the configuration information; and reporting the acquired information related to D2D to a serving cell.

13 Claims, 16 Drawing Sheets

METHOD FOR REPORTING INFORMATION RELATED TO D2D PERFORMED BY TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2015/012281, filed on Nov. 16, 2015, which claims the benefit of U.S. Provisional Applications No. 62/080,328 filed on Nov. 16, 2014, and No. 62/145,479 filed on Apr. 9, 2015, the contents of which are all hereby incorporated by reference herein in their entirety.

BACKGROUND OF THE INVENTION

Field of the Invention

The present invention relates to wireless communication, and, more particularly, to a method for reporting D2D-related information using a terminal in a wireless communication system and a terminal using the method.

Related Art

In an International Telecommunication Union Radio communication sector (ITU-R), a standardization of International Mobile Telecommunication (IMT)-Advanced being a next mobile communication system after a third generation has been performed. The IMT-Advanced is aimed at supporting an Internet Protocol (IP) based multi-media service with a data transmission rate of 1 Gbps in a stop and low speed moving state and a data transmission rate of 1 Gbps in a high speed moving state.

A 3rd Generation Partnership Project (3GPP) is preparing LTE-Advanced (LTE-A) being an improved one of Long Term Evolution (LTE) based on an OFDMA(Orthogonal Frequency Division Multiple Access)/SC-FDMA(Single Carrier-Frequency Division Multiple Access) transmission scheme as a system standard satisfying requirements of IMT-Advanced. The LTE-A is one important candidate for IMT-Advanced.

In recent years, there is growing interest in a Device-to-Device (D2D) technology performing direct communication between devices. In particular, the D2D is attracting attention as a communication technology for a public safety network. A commercial communication network has been rapidly changed to the LTE but a current public safety network is based on a 2G technology in a collision problem and a cost side with an existing communication standard. Request for the technology clearance and an improved service induces an effort to improve the public safety network.

The public safety network has high service requirements (reliability and security) as compared with a commercial communication network. In particular, when coverage of cellular communication is insufficient or is not used, there is a need for direct signal transmission/reception between devices, that is, a D2D operation.

The D2D operation may be signal transmission/reception between adjacent devices to have various advantages. For example, a D2D terminal may perform data communication with a high transmission rate and low delay. Further, the D2D operation may distribute traffic converged in a base station. If the D2D terminal serves as a relay, the D2D terminal may serve to extend coverage of a base station.

The network may manage a plurality of cells, and each cell may be allowed to change its D2D configuration on its own if necessary. For example, first and second cells are managed by the network. Initially, the first and second cells may be configured to support the D2D operation at a specific frequency. Subsequently, the first cell may continue to support the D2D operation at the specific frequency, whereas the second cell may not support the D2D operation at the specific frequency under specified conditions.

Alternatively, although the resource pools that can be used for the D2D operation for the first and second cells are configured by the network, the resource pool allocated to the actual D2D operation among the resource pools may be allowed to be determined by each of the first and second cells themselves.

In the above cases, it is problematic that it is difficult for the network to accurately figure out information on the D2D operation for each cell.

SUMMARY OF THE INVENTION

The present invention provides a method for reporting D2D-related information using a terminal in a wireless communication system and a terminal using the method.

In an aspect, a method for reporting device-to-device (D2D) related information using a user equipment (UE) in a wireless communication system is provided. The method comprises receiving configuration information to request reporting of D2D-related information for a neighboring cell, acquiring D2D-related information for the neighboring cell which is indicated by the configuration information and reporting the acquired D2D-related information to the serving cell.

The D2D-related information may include information indicating whether the neighboring cell supports D2D operation.

The method may further comprise receiving system information from the neighboring cell.

The method may further comprises if the system information includes a system information block related to the D2D operation, the UE determines that the neighbor cell supports the D2D operation.

The D2D operation may comprise at least one of D2D communication and D2D discovery.

The D2D-related information may include at least one of information on whether the neighboring cell is allowed to transmit a signal according to the D2D operation and information on whether the neighboring cell is allowed to receive a signal according to the D2D operation.

The D2D-related information may include information indicating a resource allocation scheme supported by the neighboring cell for signal transmission according to the D2D operation.

The resource allocation scheme may include at least one of a first scheme in which the UE itself selects a specific resource form an indicated resource pool and transmits a signal according to the D2D operation using the selected resource and a second scheme in which the UE transmits a signal according to the D2D operation using a resource scheduled by the neighboring cell.

The D2D-related information may include information indicating a resource allocation scheme supported by the neighboring cell for signal transmission according to the D2D operation and information indicating a radio resource control (RRC) state in which the resource allocation scheme is applicable.

The RRC state may include an RRC idle state or an RRC connected state.

The D2D-related information may include at least one of resource configuration information for the D2D operation, synchronization-signal configuration information for the D2D operation and transmission-power configuration information for the D2D operation, wherein the resource, synchronization-signal, and transmission-power configuration information are included in a system information provided from the neighboring cell.

The method may further comprise when the configuration information indicates a plurality of neighboring cells, collecting and storing the D2D-related information for each of the plurality of neighboring cells, and, then, reporting the D2D-related information to the serving cell.

Collecting and storing the D2D-related information for each of the plurality of neighboring cells may comprise collecting and storing the D2D-related information for each of the plurality of neighboring cells for a predetermined time.

The configuration information may specify information to be included in the D2D-related information.

In another aspect, a user equipment (UE) is provided. The UE comprises a radio frequency (RF) unit configured to transmit and receive a radio signal and a processor communicatively coupled to the RF unit, wherein the processor is configured to receive configuration information to request reporting of D2D-related information for a neighboring cell, acquire D2D-related information for the neighboring cell which is indicated by the configuration information and report the acquired D2D-related information to the serving cell.

According to the present invention, the terminal reports D2D-related information on the indicated cell to the network. In this way, the network can clearly know a D2D configuration for each cell, and whether the D2D operation is supported or not by each cell. When a specific terminal requiring a handover is interested in the D2D operation, if the specific terminal is handed over to a target cell that does not support the D2D operation, the continuity of the D2D operation will be broken and, thus, the reliability of the D2D operation will be lowered. In accordance with the present invention, since the network may use the D2D-related information to clearly know D2D the configuration for each cell, and whether the D2D operation is supported or not by each cell, the specific terminal may be handed over to an appropriate cell by the network. As a result, the reliability of the D2D operation can be improved and the performance of the D2D operation can be improved.

DESCRIPTION OF EXEMPLARY EMBODIMENTS

Figure 1:
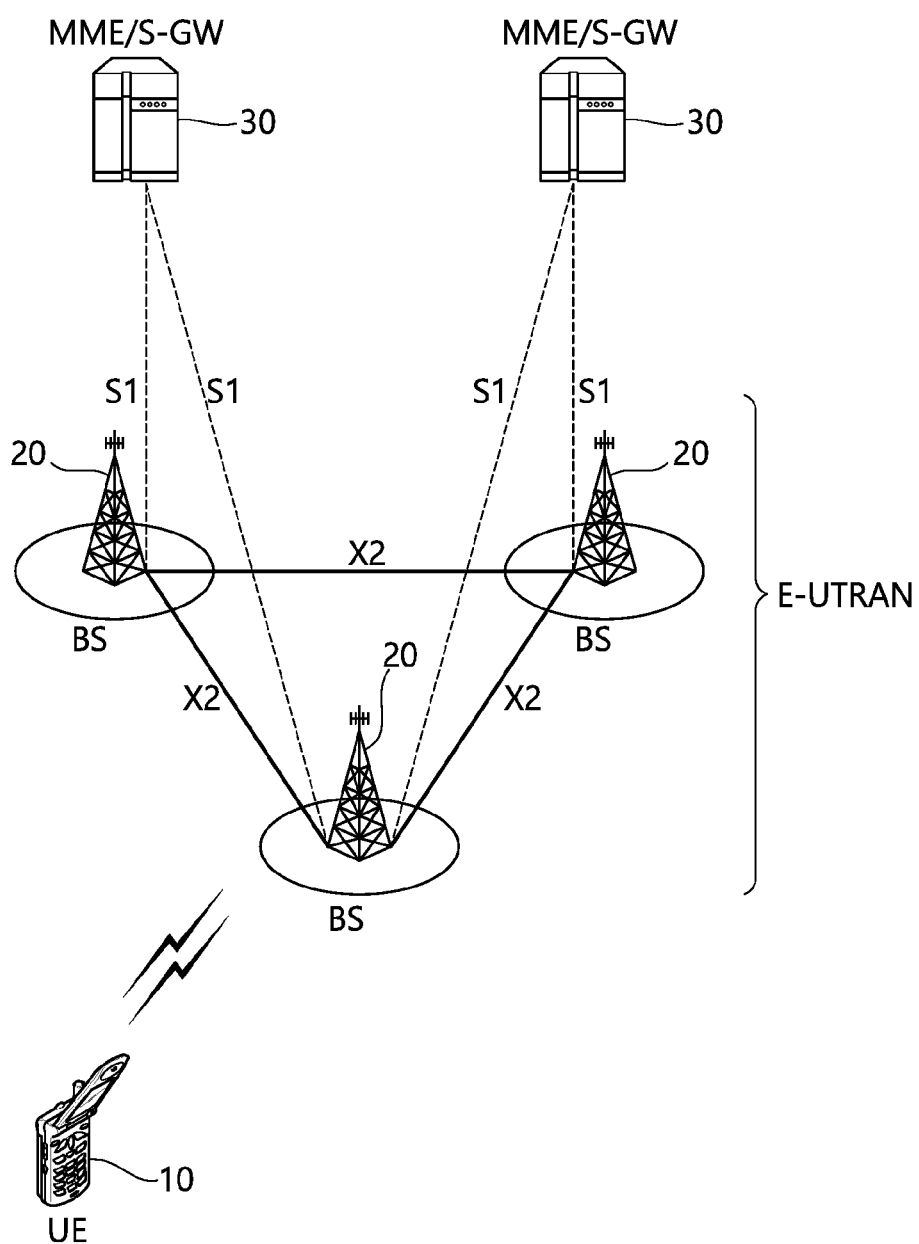
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
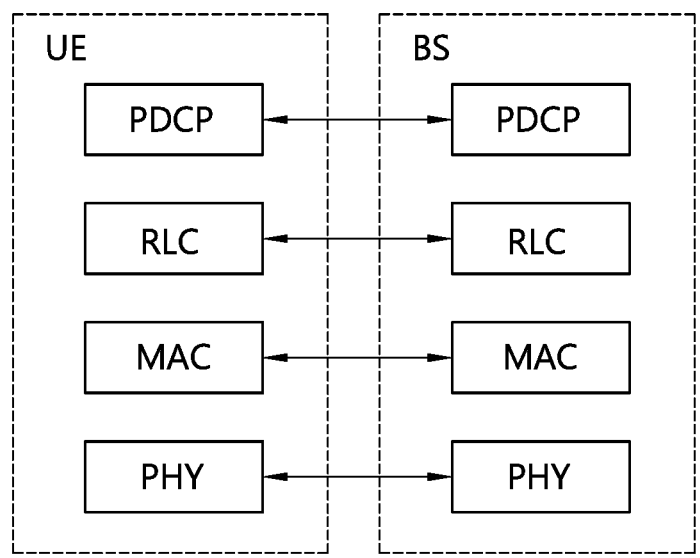
FIG. 2 is a diagram showing a wireless protocol architecture for a user plane.
Figure 3:
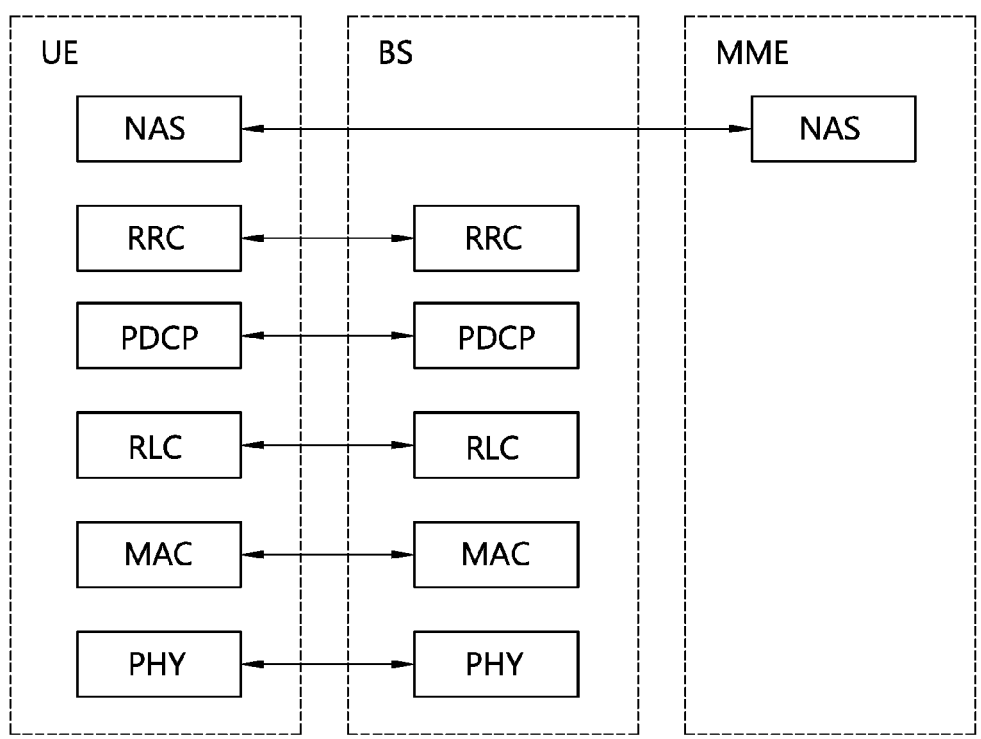
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
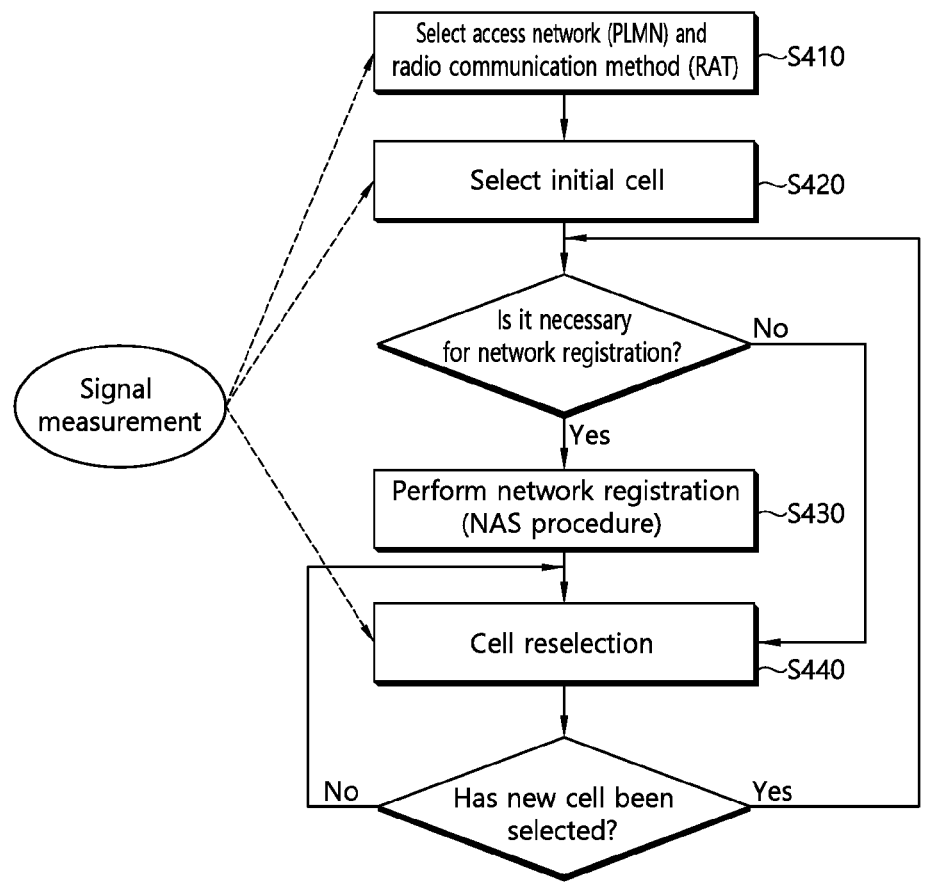
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
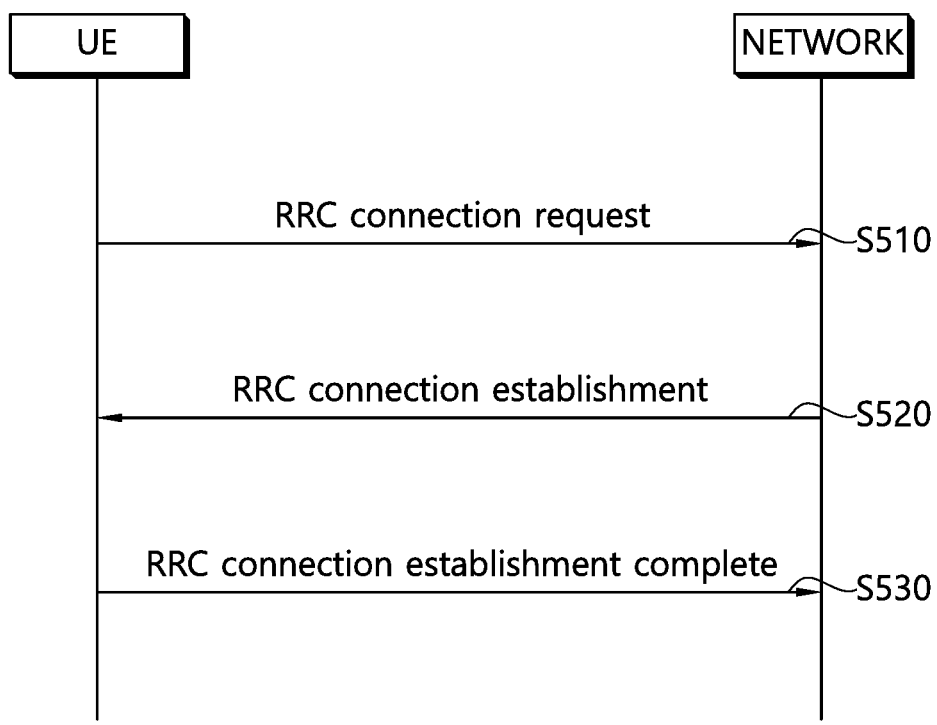
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
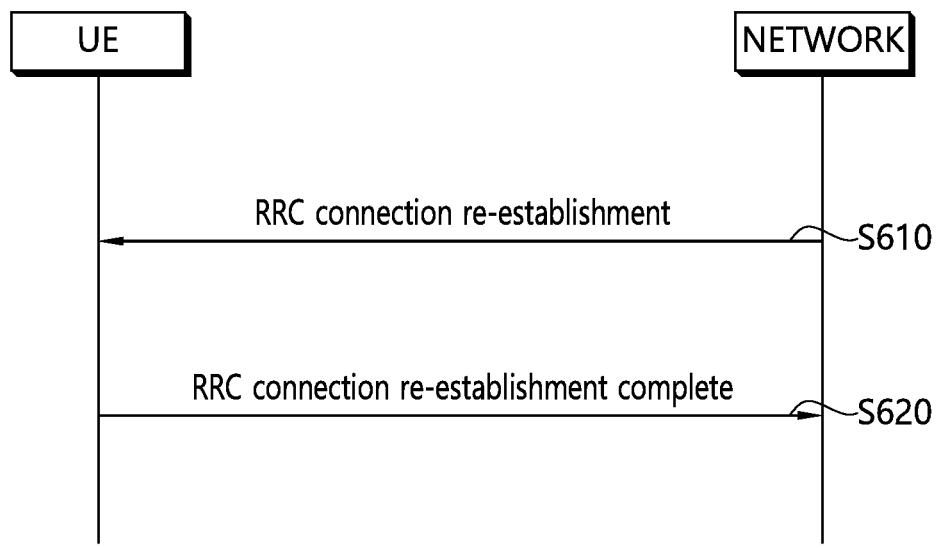
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$Srxlev > 0 \text{ AND } Squal > 0, \quad \text{[Equation 1]}$$

where:

$Srxlev = Q_{rxlevmeas} - (Q_{rxlevmin} + Q_{rxlevminoffset}) - P_{compensation}$, $Squal = Q_{qualmeas} - (Q_{qualmin} + Q_{qualminoffset})$ In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |

TABLE 1-continued

| | |
|---|---|
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, \quad R_n = Q_{meas,n} - Q_{offset} \quad \text{[Equation 2]}$$

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

- A case where UE determines that there is a serious problem in the quality of a downlink communication link (a case where the quality of a PCell is determined to be low while performing RLM) based on the radio quality measured results of the PHY layer of the UE
- A case where uplink transmission is problematic because a random access procedure continues to fail in the MAC sublayer.
- A case where uplink transmission is problematic because uplink data transmission continues to fail in the RLC sublayer.
- A case where handover is determined to have failed.
- A case where a message received by UE does not pass through an integrity check.

An RRC connection re-establishment procedure is described in more detail below.

Figure 7:
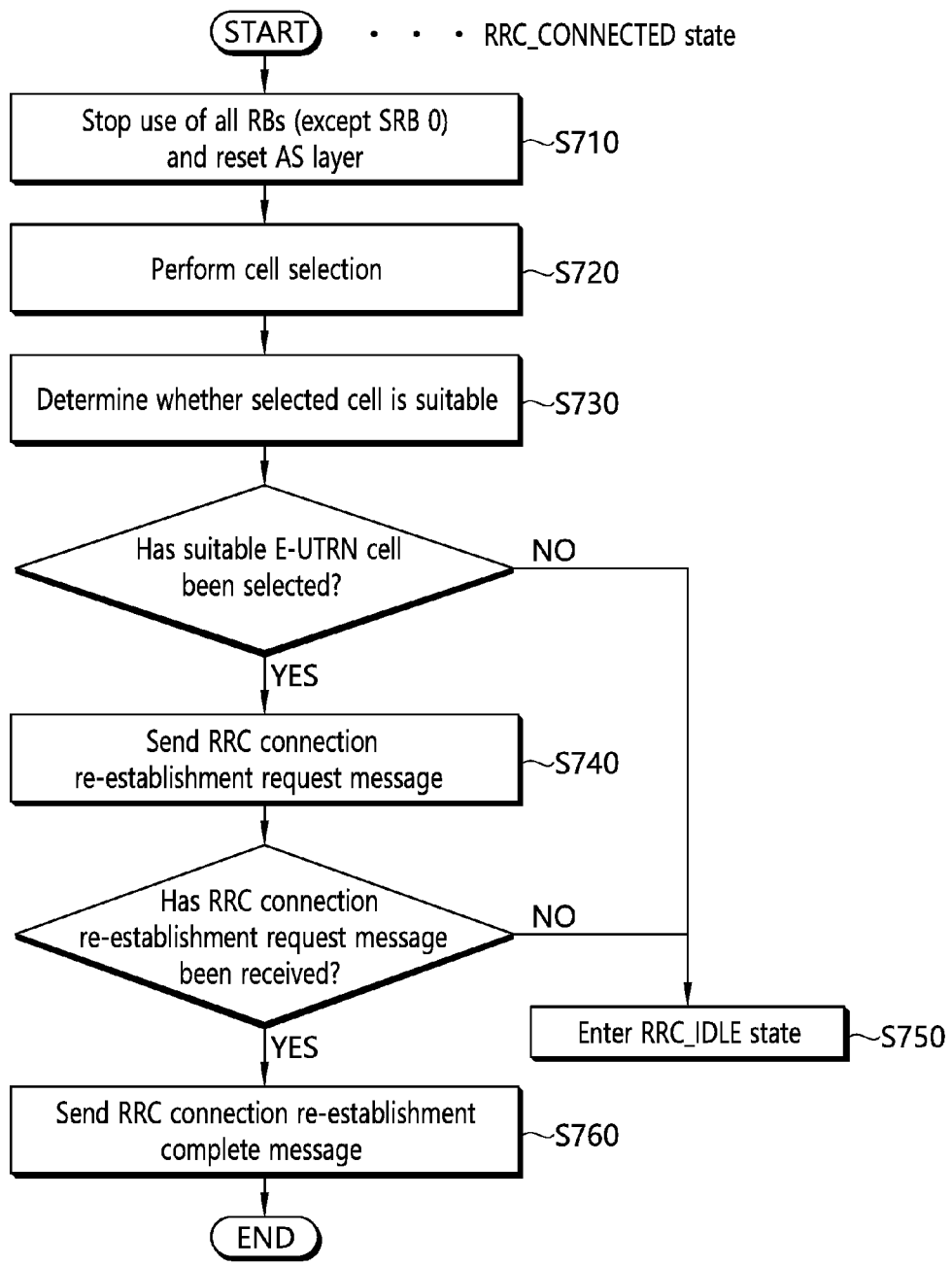
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
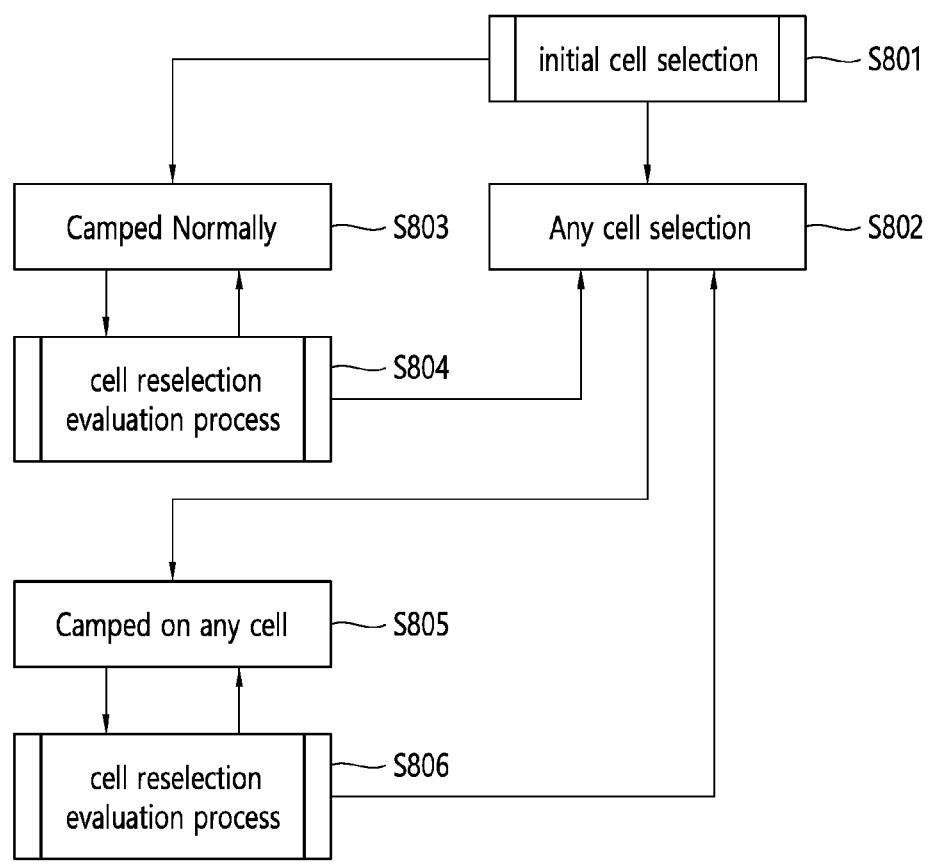
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
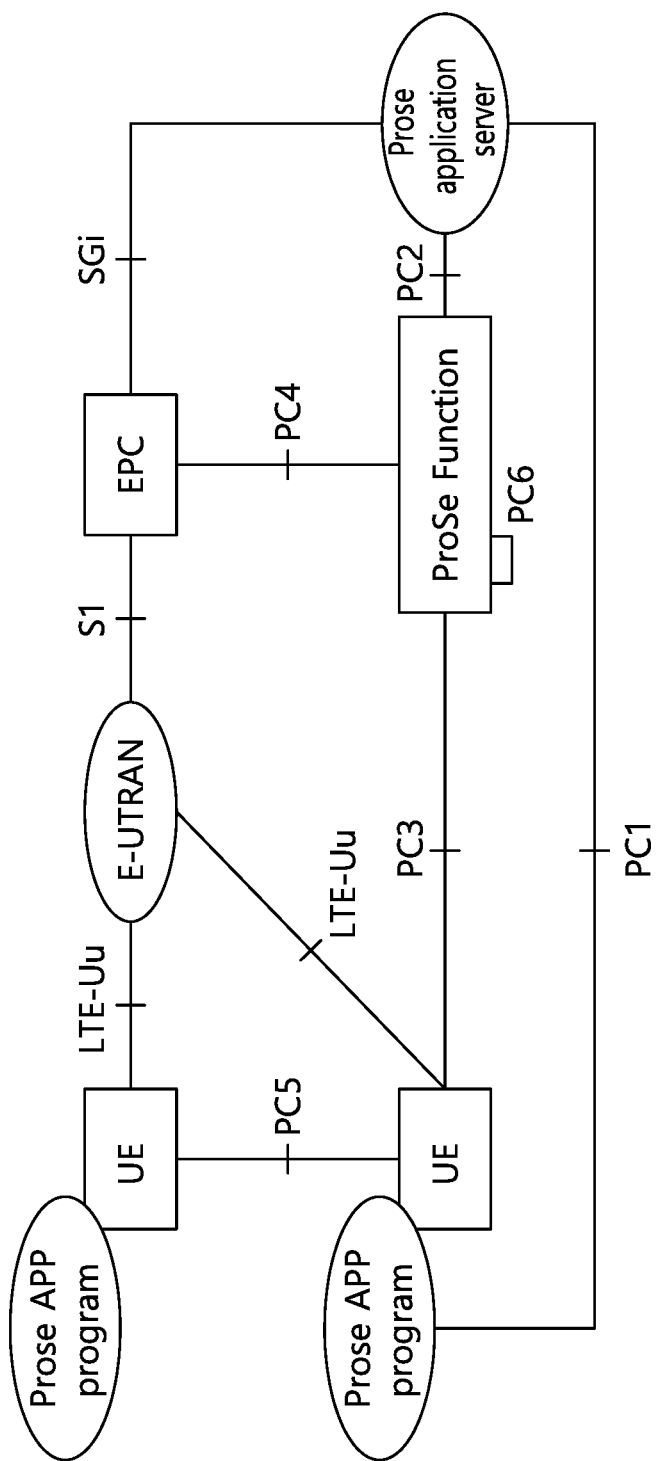
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery
ProSe related new subscriber data and handling of data storage, and also handling of ProSe identities
Security related function
Provide control towards the EPC for policy related function
Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
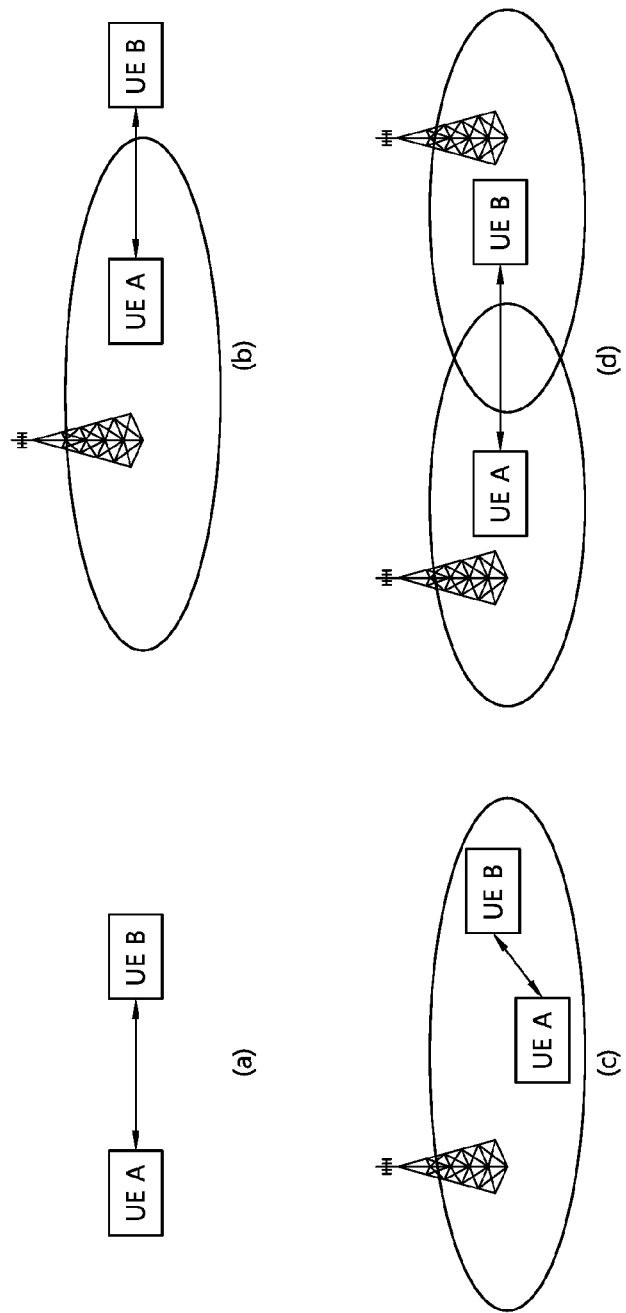
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
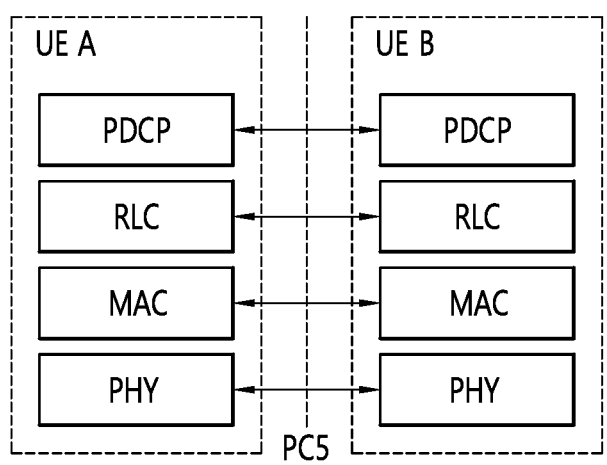
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
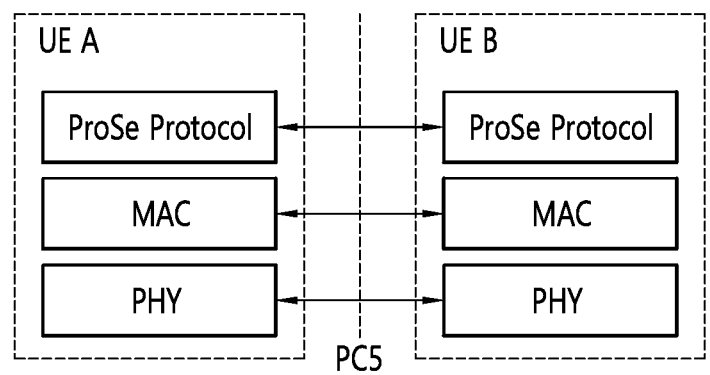
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Hereinafter, the present invention will be described.

The network may manage a plurality of cells, and each cell may be allowed to change its D2D configuration on its own if necessary. For example, first and second cells are managed by the network. Initially, the first and second cells may be configured to support the D2D operation at a specific frequency. Subsequently, the first cell may continue to support the D2D operation at the specific frequency, whereas the second cell may not support the D2D operation at the specific frequency under specified conditions.

Alternatively, although resource pools that can be used for the D2D operation for the first and second cells are configured by the network, the resource pool allocated to the actual D2D operation among the resource pools may be allowed to be determined by each of the first and second cells themselves.

In the above cases, it is problematic that it is difficult for the network to accurately figure out information on the D2D operation for each cell. In order to solve this problem, in accordance with the present invention, the network sets a cell or a frequency to UE wherein the UE requests information related to the D2D operation for the cell, and the D2D operation is carried out at the frequency. Then, the UE collects information related to the D2D operation with respect to the indicated cell or frequency and report the information to the network or a serving cell of the UE.

Figure 13:
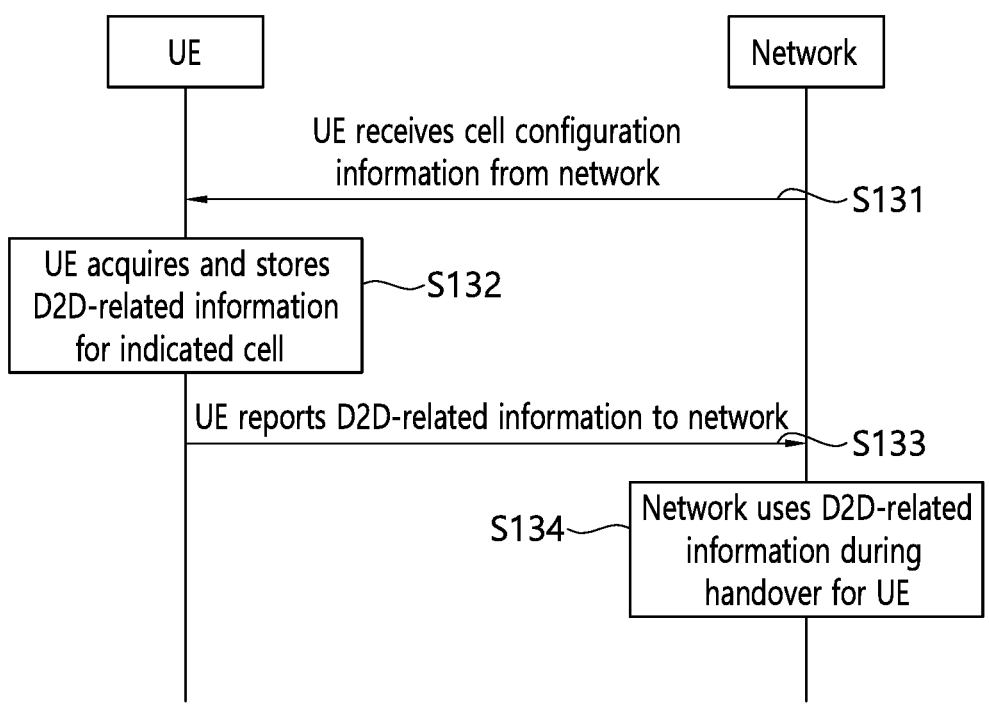
FIG. 13 shows a method for reporting D2D-related information using a terminal or UE according to an embodiment of the present invention.

FIG. 13 shows a method for reporting D2D-related information using a terminal or UE according to an embodiment of the present invention.

Referring to FIG. 13, UE receives cell configuration information from the network (S131), wherein UE requests information related to the D2D operation for the cell indicated by the configuration information.

In this connection, the network may inform, using an upper layer signal such as a radio resource control (RRC) message, the terminal of a cell (and/or frequency) whose D2D-related information should be reported by the terminal to the network. Here, the network may be a serving cell of the terminal.

For example, the network may inform, using a "measurement indication message" that indicates measurements of a reference signal received power (RSRP), a received signal strength indicator (RSSI), and a reference signal received quality (RSRQ), etc. the terminal of a cell (and/or frequency) whose D2D-related information should be collected by the terminal and then be reported by the terminal to the network. Alternatively, the network may inform, using a MDT (Minimization of Driving Test) indication message, the terminal of whether the terminal should report the D2D-related information to the network. To optimize network performance, the network obtains measurement results from the terminal. In this connection, the network acquires the measurement results together with location information associated with the measurement results from the terminal, to more efficiently optimize the network performance. In order to optimize the network, operators may acquire the measurement result and location information using the terminal. This process is called Minimization of Driving Test (MDT). The MDT indication message may indicate the terminal of a cell whose D2D related information should be reported by the terminal to the network. Alternatively, the network may inform or indicate, using a D2D operation configuration message, the terminal of a cell (and/or frequency) whose D2D-related information should be collected by the terminal and then be reported by the terminal to the network. That is, the network may request the terminal of the report of the D2D-related information thereto for the indicated cell by the network. In this connection, the request may be an immediate report request or a logged report request.

The immediate report request is a request to the terminal to acquire D2D related information for one or more neighboring cells and report the information to a serving cell of the terminal immediately upon receiving from the serving cell of the terminal the request to collect and report the D2D related information for a specific cell.

The logged report request is a request to the terminal to collect D2D-related information for one or more neighboring cells for a considerable time after the terminal receives from the serving cell the request to collect and report D2D related information for a specific cell, and, then, to report the collected D2D related information to the serving cell.

Meanwhile, when the network indicates, using the cell configuration information, UE of the cell whose D2D-related information should be reported to the network, the cell configuration information may specify details about D2D-related information to be reported to the network.

For example, the specified details about the D2D-related information to be reported to the network may include: 1)

whether signal transmission according to D2D operation is possible or not for the indicated cell, 2) whether signal transmission according to D2D communication is possible or not for the indicated cell, 3) whether or not for the indicated cell to provide resources for signal transmission according to D2D communication, 4) whether signal transmission according to D2D discovery is possible or not for the indicated cell, 5) whether or not for the indicated cell to provide resources for signal transmission according to D2D discovery, 6) whether signal reception according to D2D operation is possible or not for the indicated cell, 7) whether signal reception according to D2D communication is possible or not for the indicated cell, 8) whether or not for the indicated cell to provide resources for receiving signals according to D2D communication, 9) whether signal reception according to D2D discovery is possible or not for the indicated cell, 10) whether or not for the indicated cell to provide resources for receiving signals according to D2D discovery, 11) a resource allocation scheme supported by the indicated cell with respect to D2D communication or D2D discovery, and 12) a RRC state of a UE to which a resource allocation scheme supported by the indicated cell can be applied, etc. Alternatively, the cell configuration information may instruct the UE to acquire D2D configuration information provided by a neighboring cell and to report the acquired D2D configuration information to the serving cell as the D2D related information.

The terminal acquires and stores D2D-related information for the indicated cell/frequency (S132). The terminal may acquire/store information indicated by the cell configuration information as the D2D-related information or acquire/store predetermined information as the D2D-related information.

When the cell configuration information requests reporting of the D2D configuration information for the neighboring cell, the UE acquires the SIB for the neighboring cell and obtains the D2D configuration information included in the SIB. The D2D configuration information may include at least one of D2D transmission resource configuration information, D2D receiving resource configuration information, D2D synchronization signal configuration information, and D2D transmission power control configuration information.

The D2D transmission resource configuration information is information for configuring a resource that may be used for transmitting a signal according to D2D communication or D2D discovery. The D2D receiving resource configuration information is information for configuring a resource that may be used for receiving a signal according to D2D communication or D2D discovery. The D2D synchronization signal configuration information is information for configuring a synchronization signal for the D2D operation, and may include at least one of a cyclic prefix (CP) length, an indicator for indicating an offset value for determining a temporal position of the synchronization signal, a transmission parameter for the synchronization signal transmission, etc. The D2D transmission power control configuration information may include information for determining the transmission power at the time of signal transmission according to the D2D operation. That is, the UE may report some or all of the D2D configuration information acquired from SIB for the neighboring cell to the serving cell as the D2D-related information for the neighboring cell.

The UE may measure a timing difference between the serving cell and the neighboring cell and report information indicating the difference to the serving cell, such that upon receiving the D2D-related information for the neighboring cell, the serving cell is aware of timing information for the D2D resource information (D2D transmission resource configuration information, D2D receiving resource configuration information) for the neighboring cell based on the reported difference. The information indicating the time difference may be a time interval representing a time offset between subframe #0 of SystemFrameNumber #0 of the neighboring cell and serving cell.

For example, the terminal may acquire system information on the cell/frequency indicated by the cell/frequency configuration information.

The UE may acquire the system information for the indicated cell/frequency and may check whether the D2D operation can be performed in the state when the cell acts as a serving cell. In order to check whether the D2D operation can be performed in the cell, the UE may check whether the system information block (SIB) for D2D communication is included in the system information of the cell. That is, when a system information block (SIB 18) for D2D communication is included in the system information of the cell, it may be determined that the D2D operation is possible in the cell. Alternatively, the terminal may determine that the D2D operation can be performed in the cell when a system information block including a configuration for the D2D communication instead of the SIB 18 is included in the system information of the cell.

Alternatively, in order to check whether the D2D operation is possible in the cell, the UE may check whether a system information block (SIB 19) for D2D discovery is included in the system information of the cell. That is, when a system information block (SIB 19) for D2D discovery is included in the system information of the cell, it may be determined that the D2D operation is possible in the cell. Alternatively, the terminal may determine that the D2D operation can be performed in the cell when a system information block including a configuration for the D2D discovery instead of the SIB 19 is included in the system information of the cell.

The terminal reports D2D-related information acquired/stored with respect to the cell by the terminal to the network (S133).

That is, the UE may report the D2D operation-related capability of the cell to the network. For example, the UE may report to the network whether it is possible to transmit a signal according to the D2D operation in the cell. Alternatively, the terminal may report to the network whether signal transmission according to D2D communication is possible in the cell. Alternatively, the terminal may report to the network whether the cell provides radio resources for signaling in accordance with D2D communication. Alternatively, the terminal may report the D2D configuration information provided by the cell itself to the network.

The UE may report to the network whether or not it is possible to transmit a signal according to the D2D discovery in the cell. The terminal may report to the network whether or not the cell provides radio resources for signaling according to the D2D discovery. The terminal may report to the network whether or not the cell may receive a signal according to the D2D operation. The UE may report to the network whether or not it is possible to receive a signal according to D2D communication in the cell. The terminal may report to the network whether or not the cell provides radio resources for reception of a signal in accordance with D2D communication. The UE may report to the network whether or not it is possible to receive a signal according to the D2D discovery in the cell. The terminal may report to the network whether or not the cell provides radio resources for reception of a signal according to the D2D discovery.

Alternatively, the UE may report to the network which resource allocation scheme the cell supports for signaling according to the D2D operation. That is, the UE may report to the network whether the resource allocation scheme the cell supports for signaling according to the D2D operation is a resource allocation scheme (type 1) in which the UE selects a resource by itself from the established resource pool and transmits a signal according to the D2D operation, or a resource allocation scheme (type 2) in which the UE uses scheduling resources from the cell to transmit a signal according to the D2D operation.

The UE may report to the network a resource allocation scheme for signal transmission according to the D2D operation and a RRC state in which the resource allocation scheme is applicable. For example, for a specific cell, the UE may support the type 1 scheme only in the RRC idle state, wherein for the type 1 scheme, the UE selects a resource by itself and transmits a signal according to the D2D operation, as described above. In this case, the UE may report to the network that for the specific cell, the Type 1 scheme is supported only in the RRC idle state. The above examples do not limit the present invention. That is, it is possible for the UE to report to the network whether the RRC idle state supports the type 1 scheme, whether the RRC connected state supports the type 1 scheme, or whether the RRC idle state and the RRC connected state support the type 1 scheme.

The terminal may report the D2D related information to the network via the RRC message. Considering that, in general, the RRC message is transmitted via the Signaling Radio Bearer (SRB), the UE may transmit the D2D related information via the SRB. As an example, the terminal may include the D2D-related information in the measurement reports. Alternatively, the terminal may include the D2D-related information in the terminal information responses informing the network of its capabilities. Alternatively, the D2D related information may be included in a radio link failure (RLF) report which in turn may be reported to the network. Alternatively, the UE may report the D2D related information to the serving cell via a SidelinkUEInformation message. The SidelinkUEInformation message may be information indicating the capability/supporting operation for the terminal in relation to the D2D operation.

The network may utilize the D2D-related information for the cell during a handover process for the terminal (S134).

That is, upon receiving the D2D-related information from the terminal, the network may use the D2D-related information as follows.

The network may use the D2D-related information when determining whether the UE can be handed over to the corresponding cell. For example, when the terminal is interested in the D2D operation and a specific cell does not support the D2D operation, the network decides not to hand over the terminal to the specific cell and searches for another cell that supports the D2D operation.

The network may use the D2D-related information when determining whether or not the UE should be handed over to the corresponding cell. Alternatively, the network may use the D2D related information to determine whether to release the RRC connection with the current cell to perform cell reselection to perform the D2D operation in the RRC idle state.

Although FIG. 13 exemplifies the case of using the D2D-related information at the handover of the terminal, the present disclosure is not limited thereto. That is, the network may use the D2D-related information to optimize the D2D operation performance. For example, when the terminal of the serving cell does not know the D2D configuration of the neighboring cell/frequency for which the D2D operation is to be performed, the serving cell may request the terminal to report the D2D configuration of the neighboring cell/frequency. After the serving cell receives the D2D configuration of the neighboring cell/frequency from the UE, the serving cell may determine an optimal D2D configuration with taking into account the D2D configuration for the neighbor cell, the D2D configuration for the current serving cell, the uplink and downlink operations of the UE or terminal, and the D2D operation desired by the UE and may transmit the determined optimal D2D configuration to the UE.

Figure 14:
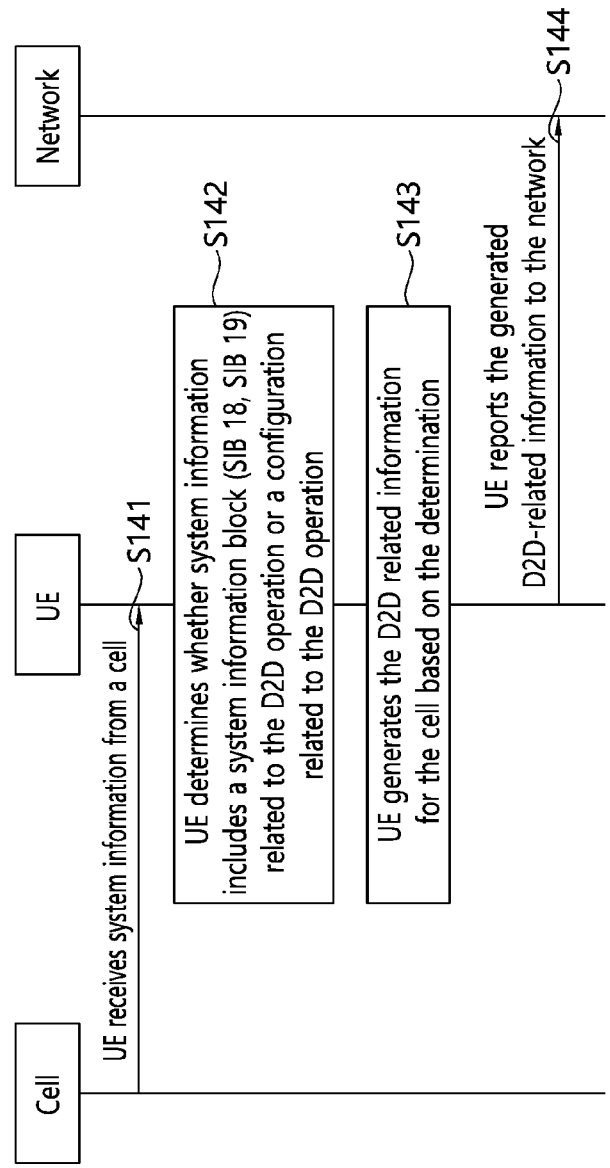
FIG. 14 is a diagram illustrating in more detail the process of the terminal collecting/storing the D2D-related information in FIG. 13.

FIG. 14 is a diagram illustrating in more detail the process of the terminal collecting/storing the D2D-related information in FIG. 13.

Referring to FIG. 14, UE or terminal receives system information from a cell (S141). The cell may be a target cell configured to report the D2D related information by the network.

The terminal determines whether the system information includes a system information block (SIB 18 or SIB 19) related to the D2D operation or a configuration related to the D2D operation (S142).

A following table 2 shows an example of the system information related to the D2D operation, more specifically, the system information block 18 (SIB type 18).

TABLE 2

```
-- ASN1START
SystemInformationBlockType18-r12 ::= SEQUENCE {
    -- Presence of SIB18 indicates that UE is allowed to provide interest indication
    -- I.e. SIB18 may be provided merely for this purpose (and thus be empty)
    commConfig-r12                                                      SEQUENCE {
        commGeneralConfig-r12         ProseCommGeneralConfig-r12        OPTIONAL,--
Need OR
            -- TBC whether general configuration parameters are common across the
different pools
        commRxPool-r12                ProseCommPoolList16-r12,
        commTxPoolNormalCommon-r12    ProseCommPoolList4-r12            OPTIONAL,-- Need OR
        commTxPoolExceptional-r12     ProseCommPoolList4-r12            OPTIONAL -- Need OR
    }
                                                                        OPTIONAL,
        -- Need OR
        lateNonCriticalExtension      OCTET STRING                      OPTIONAL,
        SLSSContinuationFlag                       1 bit
    ...
}
-- ASN1STOP
```

In the above Table 2, 'CommRxPool' indicates a resource for which the terminal is allowed to receive signals according to D2D communication. 'CommTxPoolNormalCommon' indicates a resource for which signal transmission according to D2D communication is allowed in the RRC idle state. 'CommTxPoolExceptional' indicates a resource for which signal transmission according to D2D communication is allowed when exceptional conditions are satisfied in the RRC connection state.

A following table 3 shows another example of the system information related to the D2D operation, more specifically, the system information block 19 (SIB type 19).

TABLE 3

SystemInformationBlockType19 information element

```
-- ASN1START
SystemInformationBlockType19-r12 ::=   SEQUENCE {
    discConfig-r12                                                    SEQUENCE {
                      discRxPool-r12          SL-DiscRxPoolList-r12,
                      discTxPoolCommon-r12    SL-DiscTxPoolList-r12
                                              OPTIONAL,    -- Need OR
                      discTxPowerInfo-r12     SL-DiscTxPowerInfoList-r12
OPTIONAL,             -- Cond Tx
                      discSyncConfig-r12      SL-SyncConfigList-r12
OPTIONAL              -- Need OR
    }
                                                            OPTIONAL,    -- Need OR
    discInterFreqList-r12           SL-CarrierFreqInfoList-r12
OPTIONAL,                           -- Need OR
    lateNonCriticalExtension                    OCTET STRING
                                                            OPTIONAL,
    ...
}
SL-CarrierFreqInfoList-r12 ::=     SEQUENCE (SIZE (1..maxFreq)) OF SL-
CarrierFreqInfo-r12
SL-CarrierFreqInfo-r12::=          SEQUENCE {
    carrierFreq-r12                             ARFCN-ValueEUTRA-r9,
    plmn-IdentityList-r12                       PLMN-IdentityList4-r12
                                                OPTIONAL     -- Need OP
}
PLMN-IdentityList4-r12 ::=         SEQUENCE (SIZE (1..maxPLMN-r11)) OF PLMN-
IdentityInfo2-r12
PLMN-IdentityInfo2-r12 ::=         CHOICE {
    plmn-Index-r12                              INTEGER (1..maxPLMN-r11),
    plmnIdentity-r12                            PLMN-Identity
}
-- ASN1STOP
```

In the above Table 3, 'discConfig' indicates a configuration for D2D discovery, 'discRxPool' indicates a reception resource for D2D discovery, and 'discTxPoolCommon' indicates a transmission resource for D2D discovery.

The UE determines that the system information includes the D2D operation-related system information block or the configuration related to the D2D operation for the cell, and generates the D2D related information for the cell based on the determination (S143).

The terminal reports the generated D2D-related information to the network (S144).

Figure 15:
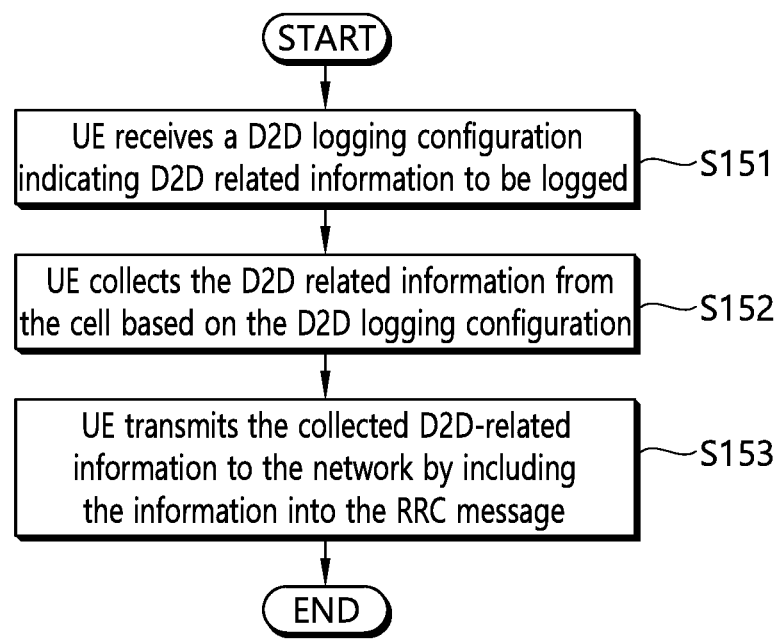
FIG. 15 shows a process of a terminal receiving a D2D logging configuration from the network and accordingly reporting the D2D related information to the network.

FIG. 15 shows a process of a terminal receiving a D2D logging configuration from the network and accordingly reporting the D2D related information to the network.

Referring to FIG. 15, the terminal receives a D2D logging configuration indicating D2D related information to be logged (S151). The D2D logging configuration may be included in the configuration information described in FIG. 13 or may be provided separately. That is, the network may inform, using D2D logging configuration, the terminal of which information to be collected/reported with respect to the D2D operation.

The terminal collects the D2D related information from the corresponding cell based on the D2D logging configuration (S152). The terminal may log the D2D operation-related capability information about the serving cell and/or the non-serving cell. In this connection, the logging may refer to a process of accumulating data.

For example, the terminal may collect or accumulate at least one of: 1) whether or not signal transmission according to the D2D operation is possible for the indicated cell, 2) whether or not signal transmission according to D2D communication is possible for the indicted cell, 3) whether or not for the indicated cell to provide resources for signal transmission according to D2D communication, 4) whether or not signal transmission according to the D2D discovery is possible for the indicated cell, 5) whether or not for the indicated cell to provide resources for signal transmission according to D2D discovery, 6) whether or not signal reception according to the D2D operation is possible for the indicated cell, 7) whether signal reception according to D2D communication is possible for the indicted cell, 3) whether or not for the indicated cell to provide resources for signal reception according to D2D communication, 4) whether signal reception according to the D2D discovery is possible for the indicated cell, 5) whether or not for the indicated cell to provide resources for signal reception according to D2D discovery.

Further, the UE may log information on which resource allocation scheme the cell supports to transmit signals according to the D2D operation. Moreover, the UE may log information on which resource allocation scheme the cell supports to transmit signals according to the D2D operation together with the RRC state in which the resource allocation scheme is applicable. For example, it is possible for UE to log information on whether the type 1 scheme is supported in the RRC idle state, whether the type 1 scheme is supported in the RRC connection state, or whether the type 1 scheme is supported in both the RRC idle state and the RRC connection state.

In an alternative, the terminal may log the performance of the D2D operation such as D2D communication or D2D discovery.

For example, the terminal may log a measurement of the interruption of the D2D communication operation. Due to the priority of wireless networks or other restrictions, D2D communication may be interrupted or discarded during the D2D operation. The terminal may log interruption occurrence probability for each of the transmission and reception of the signal according to the D2D communication. As an alternative, the terminal may perform logging of the use of an exceptional resource. For example, the terminal may log a ratio between a time duration for performing D2D communication using a general resource and a time duration for performing D2D communication using an exceptional resource, for a predetermined time period (or after receiving the configuration for D2D communication).

Alternatively, the terminal may log a delay value in connection with the D2D communication. For example, the UE may measure/log queuing delay in the uplink PDCP layer. The queuing delay represents a packet delay and may be measured/logged in accordance with the priority of the data to be transmitted. The queuing delay may be measured as a time interval from a time when the packet arrives at the PDCP layer to a time when the packet begins to be transmitted to a RLC layer or to a time when the packet begins to be transmitted to the air.

During interruption of the D2D communication operation, the ratio between a time duration for performing D2D communication using a general resource and a time duration for performing D2D communication using an exceptional resource, the queuing delay in the PDCP layer, etc. may indicate the performance of the D2D communication operation. Therefore, the terminal may measure/log the ratio and the queuing delay and then report the same to the network.

The terminal may perform the above-described logging process for a predetermined time period.

The terminal may perform the above-described logging process in the RRC idle state and/or the RRC connected state.

The terminal transmits the collected D2D-related information to the network by including the information into the RRC message (S153).

Figure 16:
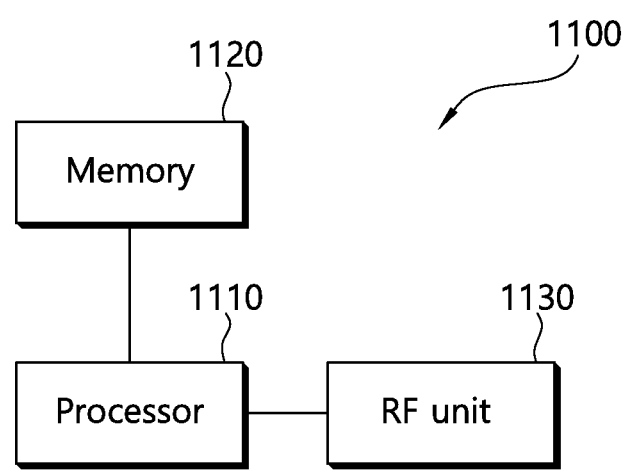
FIG. 16 is a block diagram illustrating a terminal (or UE) in which an embodiment of the present invention is implemented.

FIG. 16 is a block diagram illustrating a terminal (or UE) in which an embodiment of the present invention is implemented.

Referring to FIG. 16, a UE or terminal 1100 includes a processor 1110, a memory 1120, and a radio frequency (RF) unit 1130. The processor 1110 implements the proposed functionality, process and/or method. For example, the processor 1110 may be configured for receiving, from a serving cell of the terminal, configuration information to request reporting of D2D-related information for a neighboring cell to the serving cell, wherein neighboring cell is specified by the configuration information; acquiring D2D-related information for the neighboring cell therefrom; and reporting the acquired D2D-related information to the serving cell. Further, the D2D-related information includes information indicating whether the neighboring cell supports D2D operation. This process performed by the processor may be as described with reference to FIG. 13 to FIG. 15.

The RF unit 1130 is connected to the processor 1110 to transmit and receive radio signals.

The processor may comprise an application-specific integrated circuit (ASIC), another chipset, logic circuitry and/or a data processing unit. The memory may include a read-only memory (ROM), a random access memory (RAM), a flash memory, a memory card, a storage medium, and/or other storage devices. The RF unit may include a baseband circuit for processing the radio signal. When the embodiment is implemented in software, the above-described techniques may be implemented with modules (procedures, functions, and so on) that perform the functions described above. The module may be stored in the memory and may be executed by the processor. The memory may be internal or external to the processor, and may be coupled to the processor by various well known means.

What is claimed is:

1. A method for reporting device-to-device (D2D) related information in a wireless communication system, the method performed by a user equipment (UE), which supports D2D operation, and comprising:
   receiving, from a serving cell, configuration information, wherein the configuration information indicates whether the UE reports the D2D related information for a neighboring cell to the serving cell;
   acquiring the D2D related information for the neighboring cell based on the configuration information; and
   reporting, to the serving cell, the D2D related information, wherein the D2D related information includes:
   resource allocation type information indicating whether a resource allocation type, which is supported by the neighboring cell, is type 1 or type 2, and
   radio resource control (RRC) state information indicating a RRC state in which the resource allocation type supported by the neighboring cell is applicable, and
   wherein when the resource allocation type is type 1, the UE selects a specific resource for itself and performs the D2D operation using the specific resource, and when the resource allocation type is type 2, the UE performs the D2D operation using a resource scheduled by the neighboring cell.

2. The method of claim 1, wherein the D2D related information further includes information indicating whether the neighboring cell supports D2D operation.

3. The method of claim 1, further comprising receiving system information from the neighboring cell.

4. The method of claim 3, further comprising, when the system information includes a system information block related to the D2D operation, the UE determines that the neighbor cell supports the D2D operation.

5. The method of claim 1, wherein the D2D operation comprises at least one of D2D communication and D2D discovery.

6. The method of claim 1, wherein the D2D related information further includes at least one of:
   information on whether the neighboring cell is allowed to transmit a signal according to the D2D operation; and
   information on whether the neighboring cell is allowed to receive a signal according to the D2D operation.

7. The method of claim 1, wherein the RRC state is one of an RRC idle state and an RRC connected state.

8. The method of claim 7, wherein the RRC state information indicates that, on the neighbor cell, the type 1 is only applicable when the RRC state is the RRC idle state.

9. The method of claim 1, wherein the D2D related information further includes at least one of:
   resource configuration information for the D2D operation;
   synchronization-signal configuration information for the D2D operation; and
   transmission-power configuration information for the D2D operation, wherein the resource configuration information, synchronization-signal configuration information, and transmission-power configuration information are included in system information provided from the neighboring cell.

10. The method of claim 1, further comprising, when the configuration information indicates a plurality of neighboring cells, collecting and storing the D2D related information for each of the plurality of neighboring cells, and, then, reporting the D2D related information to the serving cell.

11. The method of claim 10, wherein collecting and storing the D2D related information for each of the plurality of neighboring cells comprises collecting and storing the D2D -related information for each of the plurality of neighboring cells for a predetermined time.

12. The method of claim 1, wherein the configuration information specifies information to be included in the D2D related information.

13. A user equipment (UE) which supports device-to-device (D2D) operation, the UE comprising:
 a radio frequency (RF) transceiver that transmits and receives a radio signal; and
 a processor communicatively coupled to the RF transceiver, wherein the processor:
 controls the RF transceiver to receive, from a serving cell, configuration information,
 wherein the configuration information indicates whether the UE reports the D2D related information for a neighboring cell to the serving cell;
 acquires the D2D related information for the neighboring cell based on the configuration information; and
 controls the RF transceiver to report, to the serving cell, the D2D related information,
 wherein the D2D related information includes:
 resource allocation type information indicating whether a resource allocation type, which is supported by the neighboring cell, is type 1 or type 2, and
 radio resource control (RRC) state information indicating a RRC state in which the resource allocation type supported by the neighboring cell is applicable,
 wherein when the resource allocation type is type 1, the UE selects a specific resource for itself and performs the D2D operation using the specific resource, and
 when the resource allocation type is type 2, the UE performs the D2D operation using a resource scheduled by the neighboring cell.

* * * * *